US005315125A

United States Patent [19]

Bannasch

[11] Patent Number: 5,315,125

[45] Date of Patent: May 24, 1994

[54] METHOD AND APPARATUS FOR PROTECTING A SHIP FROM MISSILES WITH TWO-COLOR INFRA-RED TARGET SEEKING HEADS

[75] Inventor: Heinz Bannasch, Schonau am Konigssee, Fed. Rep. of Germany

[73] Assignee: Buck Werke GmbH & Company, Uberkingen, Fed. Rep. of Germany

[21] Appl. No.: 948,102

[22] Filed: Sep. 21, 1992

[30] Foreign Application Priority Data

Sep. 18, 1991 [DE] Fed. Rep. of Germany ....... 4131096

[51] Int. Cl.[5] .............................................. G01J 1/00

[52] U.S. Cl. .............................. 250/504 R; 250/493.1

[58] Field of Search ............... 250/493.1, 494.1, 495.1, 250/504 R

[56] References Cited

U.S. PATENT DOCUMENTS 3,596,098 7/1971 Stetter .............................. 250/493.1

4,664,470 5/1987 Yerazunis ....................... 250/237 G 4,922,108 5/1990 Modlinski et al. .............. 250/504 R

FOREIGN PATENT DOCUMENTS 3217336 8/1981 Fed. Rep. of Germany .

3608578 9/1987 Fed. Rep. of Germany .

OTHER PUBLICATIONS

Tarnen und Tauschen bei der Marine, Helmut K. Herrmann (pp. 48–54) Feb. '89. No translation.

*Primary Examiner*—Bruce C. Anderson

[57] ABSTRACT

A method of protecting a ship from missiles with two-color infra-red target seeking heads and which is characterized in that an interference transmitter disposed on the ship sends out exclusively short wave infra-red rays, at least intermittently, the strength of radiation from the interference transmitter being so adjusted that the ratio of short wave to medium wave infra-red radiation is so shifted that the ship cannot be reliably recognized as a target by the two-color infra-red target seeking head.

17 Claims, 1 Drawing Sheet

Figur 1
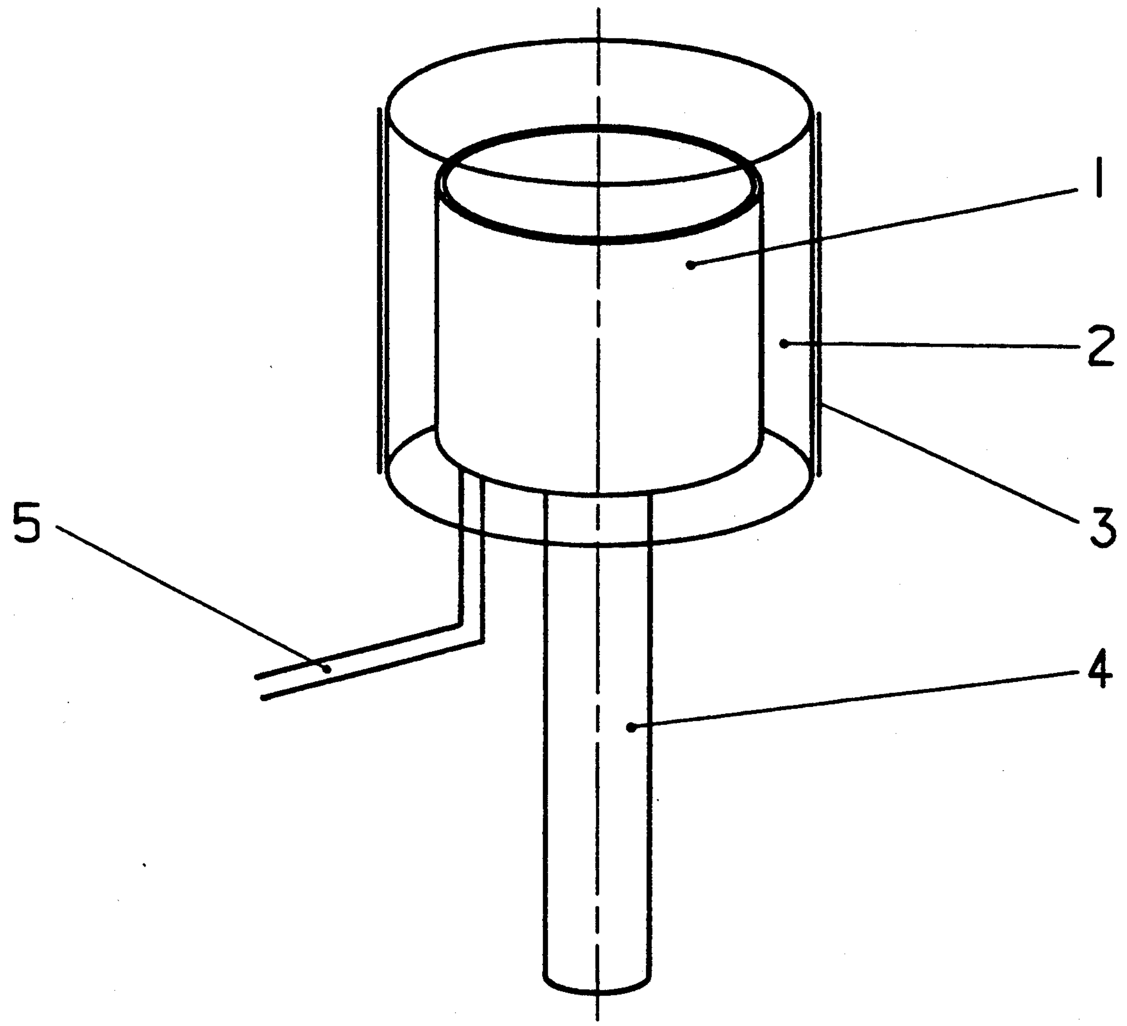

METHOD AND APPARATUS FOR PROTECTING A SHIP FROM MISSILES WITH TWO-COLOR INFRA-RED TARGET SEEKING HEADS

BACKGROUND OF THE INVENTION

The invention relates to a method of and apparatus for protecting a ship from missiles with spectrally filtering infra-red target seeking heads.

In a battle situation, ships must be protected from an attack by rockets which are equipped with infra-red seeking heads. Seeking heads identify their target on a basis of an emission which distinguishes the ship from its surroundings. In recent times, seeking heads have been used which work on two frequencies, so-called two-colour seeking heads. These seeking heads evaluate the infra-red rays both in the short wave range, i.e. approx. 0.9 to 3 μm, and also in the medium wave range, approx. 3 to 5 μm. The ratio of short wave to medium wave infra-red radiation is a characteristic parameter by which a ship can be very satisfactorily distinguished from dummy targets and the rays reflected by the sun from the surface of the water. The reflection of the sun on the water substantially delivers rays which fall only in the short wave infra-red range, so that the proportion of short wave infra-red rays to medium wave infra-red rays is shifted strongly in the direction of short wave infra-red radiation. For the protection of ships, fired infra-red dummy targets likewise have fractions of their radiation which fall within the short wave infra-red range. In contrast, a ship generally emits no radiation in the short wave infra-red range but emits considerable levels of radiation in the medium wave infra-red range, so that there is here an intense shift in the direction of the proportion of medium wave infra-red rays. This shift can be evaluated by "intelligent" seeking heads.

It is known from DE-OS 36 08 578 to safeguard ships from an attack by infra-red controlled attack weapons in that there is disposed at a distance from the ship a heat source intended to exceed the infra-red signature of the ship and so divert the missile. This source of infra-red radiation is so disposed that on the one hand it can be recognised by the seeking head as belonging to the ship and on the other offers a centre of radiation to which the missile flies whereby in the event of any detonation it is not intended that any damage be caused on the ship itself.

It is known from "Wehrtechnik", 2/89, pages 48 to 54, to protect ships from missiles fitted with seeking heads in that zonal flares are ejected which irradiate heat and imitate the infra-red signature of the ship in order in this way to guide the seeking head to these flares.

DE-OS 32 17 336 describes a method of and an apparatus for camouflaging water-borne vehicles in which sea water is pumped up and expelled forming a curtain of water which falls outside the ship and which screens the areas to be camouflaged.

On the basis of the physical circumstances, it is not possible to produce dummy pyrotechnic targets which have a similar signature or spectral intensity of radiation as a ship. The object of the invention there was to provide a method and an apparatus by which ships can be protected from missiles with two-colour seeking heads.

This problem is resolved by a method of protecting a ship from missiles with two-colour infra-red target seeking heads which is characterised in that an interference transmitter disposed on the ship emits short wave infra-red rays at least intermittently, the intensity of the radiation from the interference transmitter being so adjusted that the ratio of short wave to medium wave infra-red radiation is so shifted that the ship cannot be reliably recognised as a target for the two-colour infra-red target seeking head.

SUMMARY OF THE INVENTION

It has been found that missiles with a two-colour infra-red target seeking head can be diverted from an attack on a ship if the ship is provided with a radiation source which emits infra-red rays virtually exclusively in the short wave range since in this way the ratio of short wave to medium wave infra-red radiation can be shifted sufficiently that a seeking head operating with two infra-red frequencies cannot reliably recognise the ship as a target. Therefore, the seeking head has to seek another target which corresponds to the signature predetermined for it. These are for example clouds or islands which absorb the incident solar radiation without reflecting it and which are therefore inherent sources of radiation in the infra-red range and which have virtually a black body characteristic. Their infra-red radiation lies therefore in a range which makes them attractive as a target for the seeking head. If the seeking head fails to find a target, it continues to fly by inertial navigation and in a constant further "seeking" mode and retains its previous kinematic flight curve. In a preferred embodiment, the seeking head is diverted from the ship under control in that dummy infra-red targets are put down in synchronism with the operation of the short wave interference transmitter.

The infra-red interference transmitter used in accordance with the invention preferably gives off infra-red rays in the range from 0.9 to 3 μm, and particularly preferably in the range from 2 to 2.5 μm, but does not emit in the medium wave or long wave infra-red range. The infra-red interference transmitter preferably consists of a radiation source which emits in the desired range and which is enclosed by one or a plurality of filters impervious to medium and long wave infra-red rays and/or visible lights.

In a preferred embodiment of the method according to the invention, a black body radiator is used as a source emitting short wave infra-red rays. Within the framework of the present invention, the term 'black body radiator' is used to designate those radiation sources which give off rays corresponding substantially to the rays from a black radiator. Preferably, black body radiators are used which have a radiation intensity of at least 80 W/sr in the short wave infra-red range. Particularly preferred are black body radiators the radiation from which is guaranteed in all relevant spatial directions. For this, it is preferable to use an apparatus which consists of a tube the surface of which can be heated to a temperature of approx. 900° to 1100° C. In this temperature range, the radiation maximum from the tube is in the short wave infra-red range. The tube may be produced for example from metal, ceramic or quartz. In order to filter out medium wave and long wave infra-red rays, the heatable tube is preferably enclosed by a sheath of standard optical glass. The glass sheath is disposed at such a remoteness from the tube that the glass does not melt. Furthermore, in a preferred embodiment, there is disposed about this black body radiator a red filter which filters out the visible radiation in the range from up to approx. 900 nm, so that the apparatus does not give off any other rays which might afford a target for the target seeking head or which might otherwise attract the attention of the target to the ship. The tube can be heated electrically, pyrotechnically or even by means of a gas burner. In order to improve the degree of emission from the tube, the surface of the tube may have a V-shaped structure or a hexagonal funnel-like structure. Similarly, instead of a black body radiator, other heat radiators with correspondingly high radiation intensities in the short wave infra-red range such as for example tungsten strip lamps, Nernst rods and xenon arc lamps, but also pyrotechnic radiation sources, can be used as sources of infra-red radiation.

In a further preferred embodiment of the method according to the invention, a pyrotechnic incendiary composition having a very high intensity of irradiation in the short wave infra-red range, can be used as a radiation source emitting short wave infra-red rays. Particularly preferably, at the same time as the pyrotechnical incendiary composition is detonated, per se known dummy infra-red targets are ejected of which the burning time and time-related pattern of radiation intensity of the pyrotechnic incendiary composition corresponds to while the radiation intensity in the medium and long wave infra-red range is greater than that of the ship to be protected. The burning time and radiation intensity both of the pyro-technical incendiary composition and also of the dummy infra-red target can be adjusted to optimum levels on a basis of radiometer measurements. As a result of this measure, the dummy infra-red target constitutes a more attractive target than the ship for the two-colour seeking head, on a basis of the proportion of short wave to medium wave infra-red radiation. Pyrotechnic incendiary compositions which are suitable for this preferred embodiment are known per se. Suitable compositions are for example those which contain approx. 50% magnesium and 50% polytetrafluoroethylene.

To enhance the efficiency in a direction of menace, it is equally possible to use mirrors or reflectors to bundle and therefore amplify the radiation.

The infra-red interference transmitter emitting short wave infra-red rays (FIG. 1) is so mounted on the ship that unimpeded irradiation in all directions is guaranteed. Preferably, the radiation source is positioned in the vicinity of or directly at the point at which radiation from the ship is concentrated. A preferred location which satisfies both demands is the funnel of the ship.

In a preferred embodiment, in order further to improve the ratio of short wave to medium wave infra-red radiation emitted by the ship, at the same time as short wave infra-red rays are being emitted, the hull of the ship is cooled which results in a reduction in medium and long wave infra-red radiation. For this purpose, the ship's hull is rinsed with sea water drawn in by suction. The ABC decontamination plant installed on all larger vessels is suitable for this. Rinsing with sea water equates the temperature of the ship's hull with the temperature of the sea water so that the contours between sea and ship are confusing for a target seeking head.

A further object of the invention is an apparatus for carrying out the method described and which is characterised by a radiation source which emits short wave infra-red rays.

An apparatus for protecting a ship from missiles with infra-red target seeking heads and which is particularly suitable for carrying out the method according to the invention is characterised by a tube which can be heated to a temperature in the range from 900° to 1100° C. and which is enclosed by a sheath of standard optical glass, and which in addition comprises a red filter impervious to rays in the range of less than 900 nm. This apparatus is in particular suitable for shifting the ratio of short wave to medium wave infra-red radiation into the short wave range, so reducing the probability of two-colour heads striking a target.

BRIEF DESCRIPTION OF THE ATTACHED DRAWINGS

FIG. 1 is a diagrammatic view of an apparatus embodying the present invention.

DETAILED DESCRIPTION OF THE PREFERRED EMBODIMENT

A preferred embodiment of the apparatus according to the invention is shown in FIG. 1. A ceramic tube 1 which can be heated to approx. 1000° C. and which has a surface area of approx. 470 sq. cm, is enclosed by a glass cylinder 2 which consists of standard optical glass and which is thus impervious to medium and long wave infra-red rays. The glass cylinder 2 is disposed at such a distance from the ceramic tube 1 that it cannot melt when the ceramic tube 1 is heated. The glass cylinder 2 is enclosed by a red filter 3 which is impervious to visible radiation in the range below 900 nm. A pole 4 is used to mount the ceramic tube 1 in an exposed position on the ship. The ceramic tube 1 is heated by a heating connection 5.

By means of the infra-red interference transmitter according to the invention, it is possible to have such an intensity of radiation available in the short wave infra-red range that the proportion of short wave infra-red rays to medium wave infra-red rays emitted by the ship is shifted into such a range that for a two-colour seeking head it is difficult to impossible to differentiate between ship, sun reflections and dummy infra-red targets so that the possibility of hitting the intended target is decidedly reduced.

According to the invention, a method and an apparatus are made available which make it possible by relatively simple means to protect a ship from attack by missiles carrying two-colour target seeking heads.

Having thus described the invention, What is claimed is:

1. A method of protecting a ship from missiles with two-color infra-red target seeking heads, comprising: providing an interference transmitter on the ship emitting short wave infra-red rays at least intermittently, and adjusting the intensity of the radiation from the interference transmitter to shift the ratio of short wave to medium wave intra-red radiation so that the ship cannot be reliably recognized as a target for a missile having two-color infra-red target seeking head.

2. A method according to claim 1 wherein said infra-red interference transmitter solely emits infra-red rays in the range of 0.9 to 3 $\mu$m.

3. A method according to claim 1 wherein the radiation source of the infra-red interference transmitter is selected from the group consisting of tungsten strip lamps, Nernst rods, xenon arc lamps, pyrotechnic incendiary compositions and black body radiators.

4. A method according to one of claim 1 additionally including the step of firing dummy infra-red targets simultaneously with the emission from the interference transmitter.

5. A method according to claim 4, wherein the radiation strength pattern of the short wave interference transmitter is synchronized with that of the dummy infra-red target.

6. A method according to claim 1, wherein the radiation source is a black body radiator irradiating at least 80 W/sr in the short wave infra-red range.

7. A method according to claim 6, wherein the black body radiator is a tube which can be heated to a temperature of more than 900°.

8. A method according to claim 1, wherein the radiation source is disposed at or near the center of radiation from the ship.

9. A method according to claim 1, wherein there is included the step of cooling the ship's hull by rinsing with sea water simultaneously with the emission of short wave infra-red rays.

10. A ship assembly providing protection from missiles with two-color infra-red target seeking heads comprising:

(a) a ship;

(b) an interference transmitter on said ship emitting shortwave infra-red rays at least intermittently; and (c) means for adjusting the intensity of the radiation emitted to shift the ratio of short wave to medium wave infra-red radiation so that the ship cannot be reliably recognized as a target for a missile having two-color infra-red target seeking head.

11. A ship assembly according to claim 10, wherein to block out medium and long wave infra-red rays, the radiation source in the infra-red interference transmitter is enclosed by a filter, preferably of optical glass.

12. The ship assembly according to claim 11 wherein said filter is red to eliminate visible light.

13. A ship assembly according to claim 10 wherein the interference transmitter comprises a tube which can be heated to a temperature in the range of 900° to 1100° C. and which is enclosed by a sheath of standard optical glass and a red filter which is impervious to radiation of less than 900 nm.

14. A ship assembly according to claim 13, including means to focus the irradiation characteristic in the relevant direction of an oncoming missile.

15. A ship assembly according to claim 10 including means to focus the irradiation characteristic in the relevant direction of an oncoming missile.

16. The ship assembly according to claim 10 wherein said infra-red interference transmitter solely emits infrared rays in the range from 0.9 to 3 $\mu$m.

17. The ship assembly according to claim 10 wherein the radiation source of the infra-red interference transmitter is selected from the group consisting of tungsten strip lamps, Nernst rods, xenon arc lamps, pyrotechnic incendiary compositions and black body radiators.

* * * * *